United States Patent

[11] 3,592,969

[72] Inventors Hirokazu Yoshino; Tomio Yoshida, both of Kitakawachi-gun, Osaka, Japan

[21] Appl. No. 843,573
[22] Filed July 22, 1969
[45] Patented July 13, 1971
[73] Assignee Matsuskita Electric Industrial Co., Litd. Osaka, Japan
[32] Priority July 24, 1968, May 27, 1969
[33] Japan
[31] 43/52897 and 44/43421

[54] SPEECH ANALYZING APPARATUS
10 Claims, 13 Drawing Figs.

[52] U.S. Cl. 179/1 SA
[51] Int. Cl. G10l 1/00
[50] Field of Search 179/1 SA, 15; 325/38

[56] References Cited

UNITED STATES PATENTS

| | | | |
|---|---|---|---|
| 3,518,548 | 6/1970 | Greefkes et al. | 325/38 |
| 3,384,839 | 5/1968 | Miller | 332/14 |

*Primary Examiner*—Kathleen H. Claffy
*Assistant Examiner*—Horst F. Brauner
*Attorney*—Stevens, Davis, Miller & Mosher

ABSTRACT: One of the greatest problems tending to occur in an attempt to effect speech recognition with a speech recognition apparatus is that individual difference is present in the speech frequency distribution. Obviously, the apparatus fails to recognize a speech correctly which can naturally be recognized by the human being, if there is such individual difference.

This specification discloses an apparatus wherein individual difference is eliminated from the frequency to time pattern to normalize such pattern in an attempt to effect speech recognition, thereby making it possible to achieve accurate speech recognition.

H. YOSHINO
and
T. YOSHIDA
INVENTORS

BY Stevens, Davis, Miller & Mosher
ATTORNEYS

SPEECH ANALYZING APPARATUS

This specification relates to a speech analyzing apparatus.

In a speech spectrum distribution at any point in time, there are usually from one to four energy concentrations (local peaks) or formants which are formed in the oral cavity and nasal cavity by which the voice producing organ of the man is constituted. Such formant depends upon the configuration and volume of the cavity extending from the vocal chord to the tongue. More specifically, the greater the cavity, the lower the formant frequency as a whole, and the smaller the cavity, the higher the formant frequency as a whole. Individual difference exists in the configuration and volume of the cavity extending from the vocal chord to the tongue. Thus, even for the same speech sound, individual differences occur in the frequency distribution of the formant. However, even if an individual difference is present in the formant distribution, the word is recognized as having the same meaning, and therefore it is considered that the relationship between the formants is relatively constant.

The conventional speech analyzing apparatus is provided with only such functions as to filter speech sound signals by means of a plurality of band pass filters each having a predetermined frequency band and send the outputs of the respective band pass filters to a storage matrix circuit sequentially with a lapse of time in order to store them therein. Incidentally, the aforementioned filters are set up so that the entire pass frequency bands thereof cover the speech frequency range.

With such a conventional system, there is the tendency that the frequency to time pattern of the storage matrix circuit differs from man to man, due to the individual difference in voice, such as for example the difference in pitch frequency. That is, the frequency to time patterns with respect to voice "*a*" given by plural persons turn out to be different from each other. Thus, there is the possibility that the speech analysis or recognition fails to be made correctly in the case where the foregoing system is applied to an apparatus provided with the function for effecting speech recognition as well as that for effecting speech analysis.

The present invention is intended to solve the aforementioned problems.

It is a primary object of the present invention to encode the relationship between formant frequency and time which is normalized irrespective of individual difference in speech sound, thereby constructing a speech recognition apparatus and speech transmitting apparatus which are greatly improved over the conventional speech recognition apparatus.

Another object of the present invention is to achieve high-speed voice analysis to thereby make it possible to discriminate between a vowel and a consonant, especially a short consonant.

The present invention has been made in view of the fact that there are certain constant relationships between the formants, although speech sound signals given by speakers are different from each other in respect of pitch frequency. The present invention is characterized in that there is produced a signal which varies with variations in the pitch frequency, the sum of or the difference between this signal and speech sound signal to be analyzed is obtained, and thereafter a frequency to time pattern with respect to the signal thus processed is obtained. By this method, it is possible to eliminate individual difference from the aforementioned pattern and normalize the latter.

Other objects, features and advantages of the present invention will become apparent from the following description taken in conjunction with the accompanying drawings, in which:

FIG. 1 is a diagrammatic view showing the speech analyzing apparatus according to an embodiment of the present invention;

FIGS. 2*a* and 2*b* are graphs showing the characteristics of an element incorporated therein;

Figure 1:
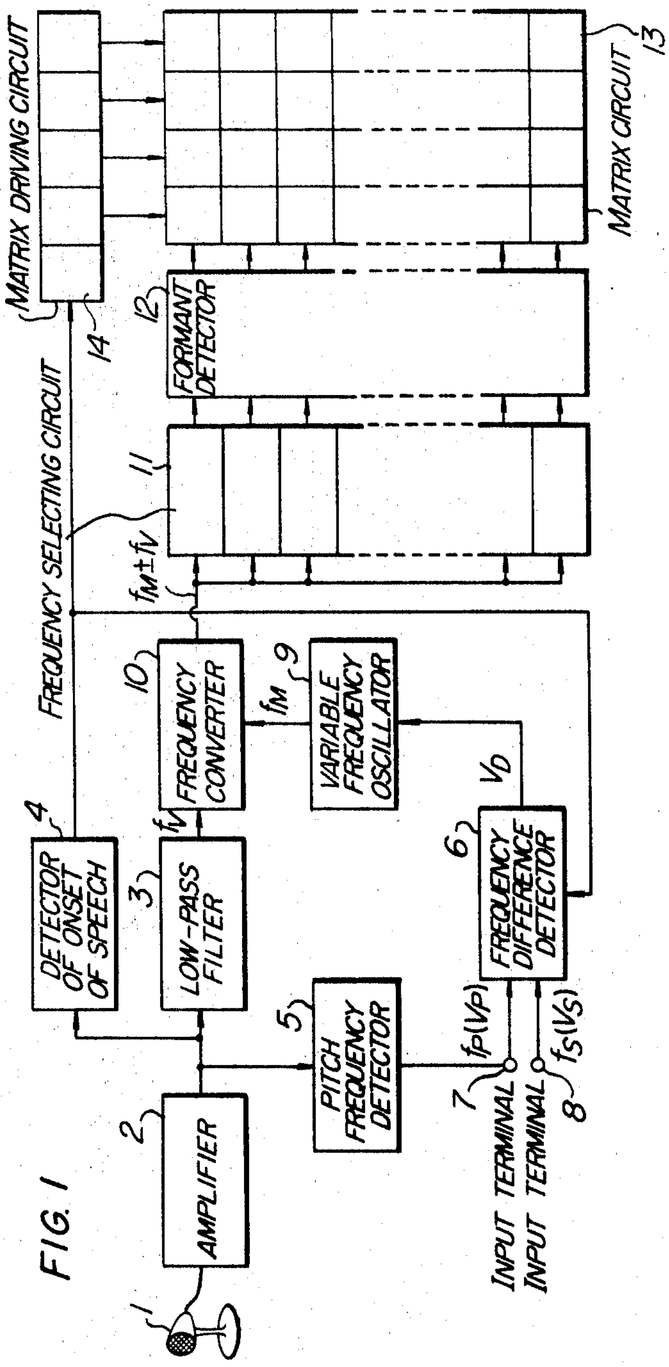

The present invention will now be described with respect to one embodiment thereof shown in FIG. 1, wherein sound waves are converted to electrical signal by means of a microphone 1, and the resulting electric signal is amplified in an amplifier 2 the output of which is in turn applied to a low pass filter 3, a detector 4 of onset of speech sound and pitch frequency detector 5. The detector 4 of onset of speech sound is adapted to detect the starting time of an input voice signal and provide a pulse signal. This signal occurs to thereby start various elements which will be described later. The pitch frequency detector 5 detects the pitch frequency of an input voice signal to provide a pulse signal having a repetition rate $f_p$ equal to the pitch frequency. This pulse signal is supplied to one of the input terminals 7 of a frequency difference detector 6. This frequency difference detector 6 is adapted to provide a DC voltage output $V_D$ in accordance with a frequency difference $(f_s-f_p)$ between a signal of a standard frequency $f_s$ imparted to the other input terminal 8 thereof and the aforementioned pulse signal. In practice, it is easier to compare a voltage $V_p$ corresponding to the frequency $f_p$ and a voltage $V_s$ corresponding to the standard frequency $f_s$ with each other. Such a linear relationship as shown in FIG. 2*a* is established between the frequency difference $(f_p-f_s)$ and the DC output voltage $V_D$ so as to increase the DC output voltage $V_D$ as the frequency difference increases. The DC output voltage $V_D$ is applied to a variable frequency oscillator 9 to enable the latter to provide a sinusoidal waveform signal having a frequency $f_M$. The oscillation frequency $f_M$ available from the variable frequency oscillator 9 has such a linear relationship as shown in FIG. 2*b* with respect to the DC output voltage $V_D$ available from the frequency difference detector 6. That is, the oscillation frequency is $f_{MO}$ when the voltage $V_D$ is zero; it increases as the voltage $V_D$ increases in the positive direction; and it decreases as the voltage $V_D$ increases in the negative direction.

The input voice signal filtered out by means of the low pass filter 3 to eliminate therefrom frequency components higher than those required for the speech analysis is supplied to one of the input terminals of a frequency converter 10, and the output of the variable frequency oscillator 9 is applied to the other terminal thereof. On the assumption that the frequency of the filtered-out voice signal is $f_v$, a signal converted to a frequency of $(f_M \pm f_v)$ is obtained at the output terminal of the frequency converter, e.g., a double balanced modulator which will be described later. This signal having a frequency of $(f_M \pm f_v)$ is supplied to a frequency selecting circuit 11 which is constituted by a plurality of filters. Preferably, the higher frequency $(f_M+f_v)$ is rectified to be used in order to increase the analyzing speed by reducing the time constants of the succeeding elements such as integrators for example. Each of the filters constituting the aforementioned frequency selecting circuit 11 is provided with such a band width as to enable a predetermined frequency band in a frequency range of $(f_{MO}+200)$ $H^z$ to $(f_{MO}+5000)H^z$ to pass therethrough.

The frequency selecting circuit 11 is so designed as to divide an input speech frequency into a plurality of bands, which are in turn supplied to a formant detector 12 which is adapted to detect a formant from the divided band signals. The formant is stored in a matrix circuit 13 adapted to serve as memory means appointed in respect of time from the onset of speech sound. At this time, a matrix driving circuit 14 is started by the output of the detector of sound onset 4 so as to drive the matrix circuit 13, so that the "write" column of the matrix circuit 13 are appointed at predetermined time intervals from the voice starting point. Thus, a formant occurring in the neighborhood of the voice starting point is stored in the leftmost column of the matrix circuit 13, and a formant occurring during the subsequent time interval is stored in the second column. In this way, a formant is stored in the matrix circuit 13 at every time interval If energy concentration occurs in a particular band in an appointed time interval, then "1" is written into the matrix elements in the row corresponding to that particular band, and unless energy concentration is present in the other bands, "0" is w4ritten into all the elements other than those elements.

Figure 3:
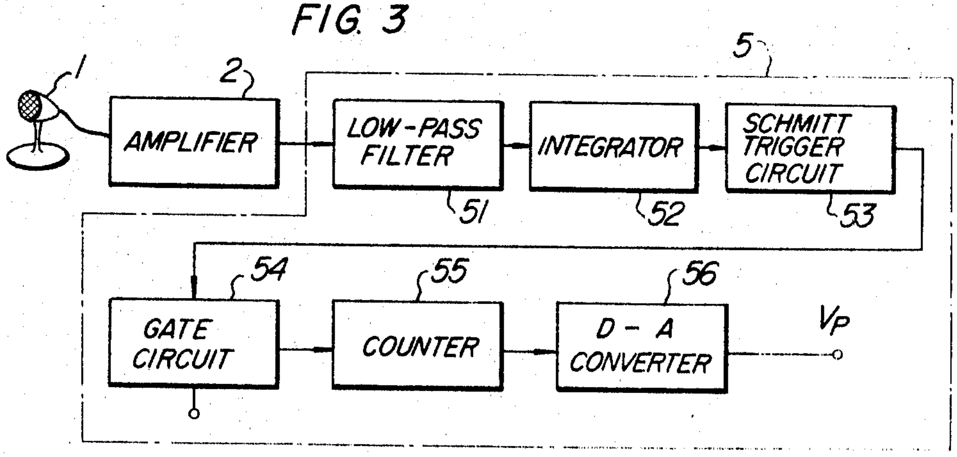
FIGS. 3 to 10 are views useful for explaining the respective elements constituting the apparatus shown in FIG. 1.

Further description will now be made of the various elements constituting the arrangement shown in FIG. 1. FIG. 3 shows the pitch frequency detector 5 and its peripheral arrangement, wherein the speech sound is converted to an electric signal by means of the microphone 1, thereafter amplified in the amplifier 2 and then filtered by means of a low-pass filter 51 of which the upper frequency is 300 $H^Z$. The output of the filter 51 is integrated by an integrator 52 so that a signal oscillating at the pitch frequency is produced which in turn is converted into a rectangular signal having a repetition rate equal to the pitch frequency by means of a Schmitt trigger circuit 53. The resulting rectangular signal is supplied to a counter 55 through a gate circuit 54 which is performing gating operation under the control of a control signal, so that the pitch frequency of the input signal is counted. The result obtained through the counting operation of the counter 55 is converted into an analog signal by a digital-analog converter 56, and the DC output $V_p$ available from the counter 56 is proportional to the pitch frequency of the input signal.

The matrix circuit 13 is generally constituted by bistable circuit or magnetic core memories.

Figures 4, 5:
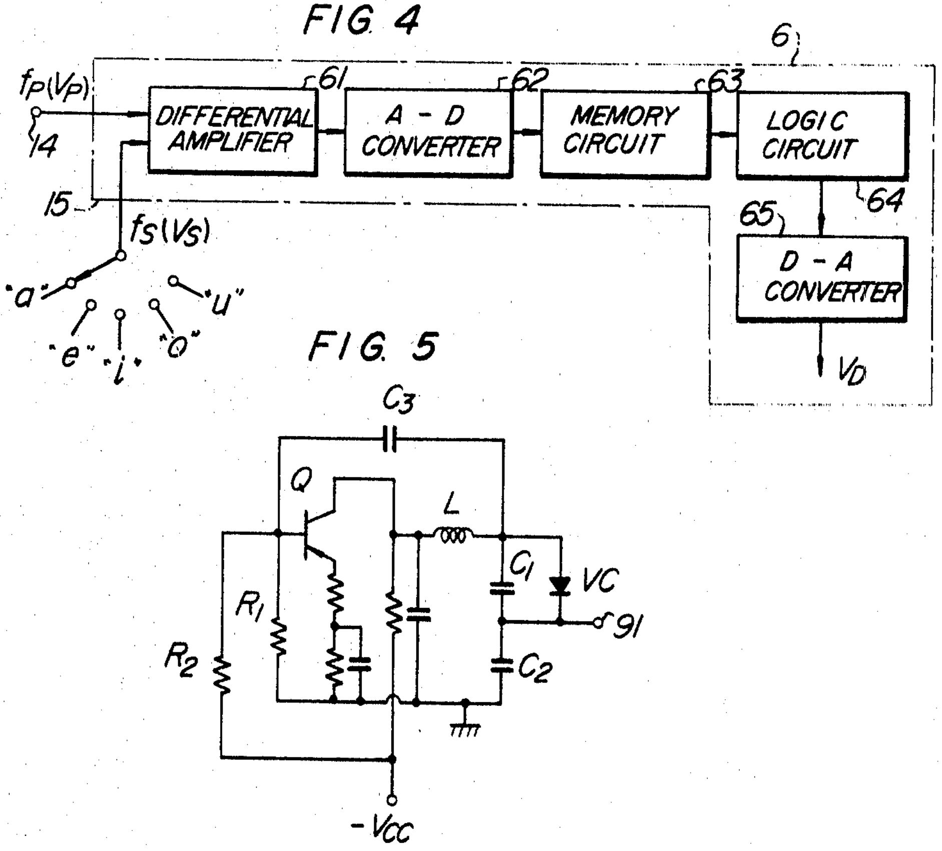

Referring to FIG. 4, there is shown a frequency difference detector 6 which is adapted to detect a difference between the frequencies of two input signals, namely, a difference between the pitch frequency of an input voice signal and that of a standard voice signal so as to produce and hold a DC voltage proportional to such difference. One of the input terminals 14 of a differential amplifier 61 is provided with the aforementioned DC voltage $V_p$ available from the pitch frequency detector 5 which is proportional to the pitch frequency $f_p$, and the other input terminal 15 is provided with a DC voltage having a level proportional to the standard pitch frequency representing "*a*,""*e*," "*i*," "*o*" or "*u*" through a changeover switch $S_1$. Further, the differential amplifier is designed so that no output is provided thereby when the DC voltages applied to the two input terminals thereof are equal to each other.

If "*a*" which is one of the Japanese vowels is pronounced by a speaker while a DC voltage corresponding to the standard vowel "a" has been applied to the input terminal 15 of the differential amplifier 61 through the changeover switch $S_1$, then a voltage $e_1$ corresponding to the difference between the standard pitch frequency and the pitch frequency of the speaker is obtained at the output of the differential amplifier 61. This voltage $e_1$ is converted to a digital signal by means of the analog-digital converter 62 and then stored in a memory circuit 63. Then, by switching the switch $S_1$, differences between the standard pitch frequencies of "*e*," "*i*," "*0*," and "*u*" and the corresponding pitch frequencies of the speaker are obtained, and voltages $e_2$, $e_3$, $e_4$ and $e_5$ corresponding to such differences respectively are stored in the memory circuit 63 in the same manner as described above. A logic circuit 64 is adapted to provide a digital signal corresponding to the arithmetical mean of the output voltages available from the memory circuit 63 as represented by $$\sum_{i=1}^{5} e_i/5$$

This digital signal is converted to an analog signal such as DC voltage $V_D$ and held with the aid of a digital-analog converter 65.

FIG. 5 shows the variable frequency oscillator 9 of which the output frequency is varied with the output voltage $V_D$ of the frequency difference detector 6 which is imparted to the input terminal 91 thereof. More specifically, variable capacitance diode VC is connected in parallel with a capacitor $C_1$ and constitutes a series resonance circuit along with a capacitor $C_2$ and a coil L. A transistor Q is given a base bias voltage by resistors $R_1$ and $R_2$, and series resonance voltage determined by the capacitors $C_1$ and $C_2$, variable capacitance diode VC and coil L is fed back to the base through a capacitor $C_3$, so that it is enabled to perform the oscillating operation. The potential at the cathode of the variable capacitance diode increases upon application of the voltage $V_D$ to a terminal 91, so that the capacitance of the variable capacitance diode VC is decreased with increase of the voltage $V_D$. Thus, the resonance frequency of the aforementioned series resonance circuit is increased so that the oscillation frequency is increased. If the voltage $V_D$ is decreased on the contrary, then the oscillation frequency is also decreased. The oscillation output may be taken from the collector of the transistor Q.

Figures 6, 7, 8:
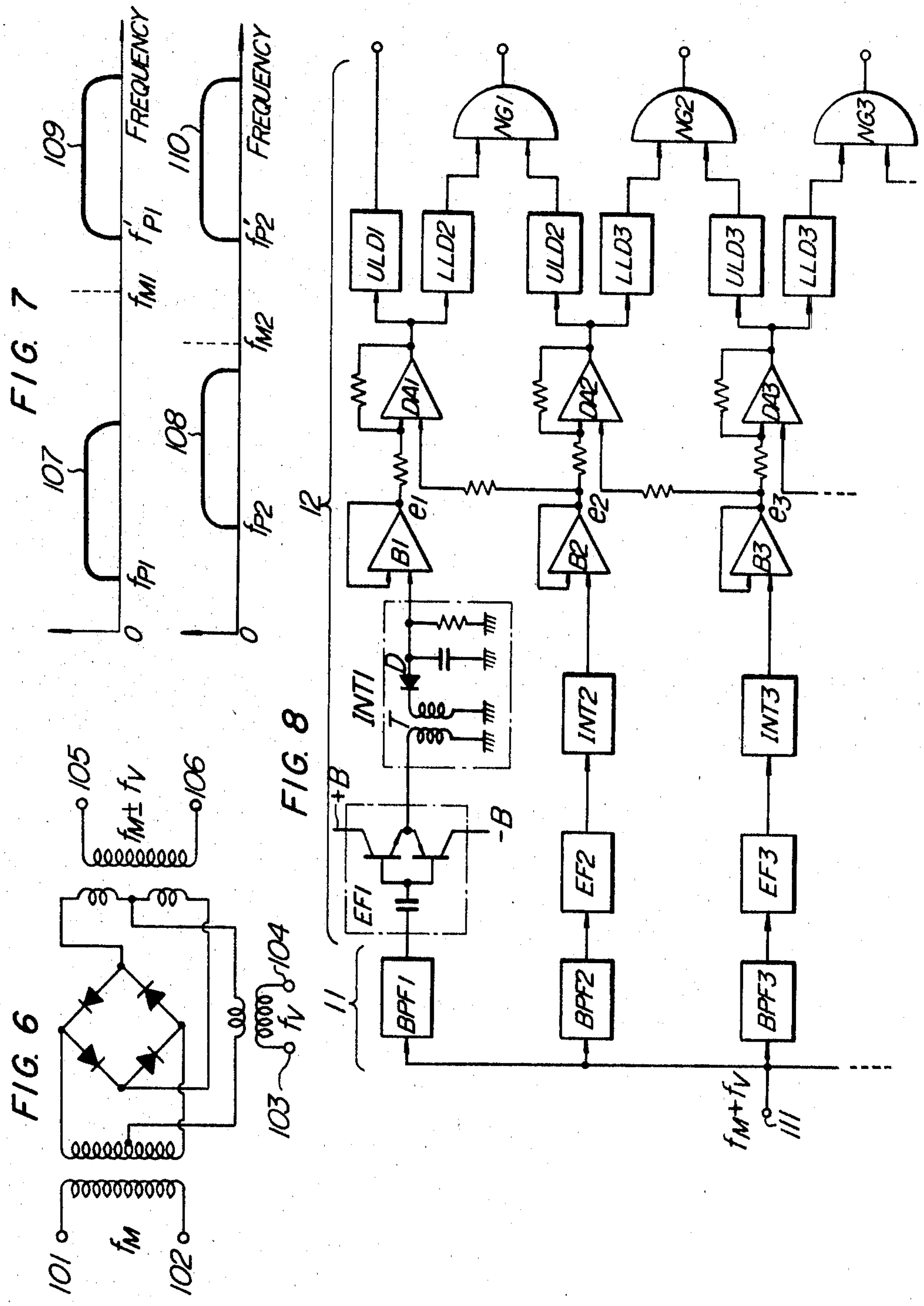

Referring to FIG. 6, there is shown the frequency converter 10 which is constructed by the use of a double balanced modulator for example, wherein the output (oscillation frequency $f_M$ ) of the variable frequency oscillator 9 is applied across terminals 101 and 102 and a voice signal (frequency $f_v$) is supplied across terminals 103 and 104, thus, by modulating the voice signal ($f_v$) with the output (frequency $f_M$) of the variable frequency oscillator the frequency band of the voice signal ($f_v$) is converted, so that signals of ($f_M+f_v$) appear across output terminals 105 and 106. Here, the sum signal ($f_M+f_v$) is transmitted to the succeeding stages as described above. As will be apparent to those skilled in the art, it is also possible that an amplitude modulator may be employed instead of the double balanced modulator.

FIG. 7 is a view useful for explaining the output characteristics occurring at the output terminals 105 and 106, wherein numeral 107 represents the voice frequency band of a speaker whose pitch frequency is $f_{p1}$, 108 the voice frequency band of a speaker whose pitch frequency is $f_{p2}$, and 109 the output frequency band when a voice signal within the voice frequency band 107 is supplied across the terminals 103 and 104, wherein the output frequency $f_{M1}$ of the variable frequency oscillator 9 which depends upon the pitch frequency $f_{p1}$ is applied across the terminals 101 and 102 so as to be shifted to the high frequency range and the pitch frequency is changed to $f_{p1}'$. Numeral 110 denotes the output frequency band when a voice signal within the voice frequency band 108 is supplied across the terminals 103 and 104, wherein the output frequency $f_{M2}$ of the variable frequency oscillator 9 is applied and the pitch frequency is shifted to $f_{p2}'$. Thus, the following relationships hold true:

$f_{p1}'=f_{p1}+f_{M1}$, $f_{p2}'=f_{p2}+f_{M2}$ It is easy to design a variable frequency oscillator 9 so that the output frequencies $f_{M1}$ and $f_{M2}$ thereof may be varied with the pitch frequency so as to satisfy the following condition:

$f_{p1}'=f_{p2}'$ By using the oscillator 9 capable of meeting such a condition, it is possible to make the pitch frequency substantially equal, irrespective of the speaker. Thus, a voice signal is corrected and normalized in terms of frequency.

FIG. 8 shows the arrangement of the frequency selecting circuit 11 and that of the formant detector 12. The voice signal which has been normalized in the frequency converter 10 is first supplied to the frequency selecting circuit 11 by way of a terminal 111. The frequency selecting circuit 11 is composed of a plurality of band-pass filters BPF1, BPF2, BPF3,....by which the voice signal is divided into the respective pass bands. The output of the respective band-pass filters BPF1, BPF2, BPF3,....are imparted to emitter-follower circuits EF1, EF2, EF3,....each corresponding to the formant detector 11 respectively. The outputs of the emitter-follower circuits EF1, EF2, EF3,....are supplied to integrators INT1, INT3,INT3, ....so as to be integrated thereby respectively. The integrator INT1 is coupled to the emitter-follower circuit EF1 through a transformer T which rejects the DC level of the output of the EF, so that a signal induced across the secondary coil of the transformer T is rectified by a diode D and then integrated by a parallel circuit of a capacitor C and resistor R. The remaining integrators INT2, INT3,....are also constructed in the same way. Further, the outputs of the integrators INT1, INT2, INT3,....are supplied to buffer amplifiers B1, B2, B3, .... respectively, and the outputs $e_1$, $e_2$, $e_3$,....of the buffer amplifiers B1, B2, B3,....supplied to differential amplifiers DA1, DA2, DA3,....respectively. Each of these differential amplifiers DA1, DA2, DA3,....is adapted to amplify the difference between adjacent ones of the outputs $e_1$, $e_2$, $e_3$, ....of the buffer amplifiers B1, B2, B3, .... For example, the outputs $e_1$ and $e_2$ of the buffer amplifiers B1 and B2 are imparted to the differential amplifier DA1 so that the difference between these two outputs or $(e_1—e_2)$ is amplified therein. The output of the differential amplifier DA1 is supplied to upper and lower level discriminators ULD1 and LLD1. Similarly, difference voltages $(e_2—e_3)$, $(e_3—e_4)$, ....are amplified by the remaining differential amplifiers DA2, DA3,....respectively, and the outputs of these differential amplifiers DA2, DA3,....are supplied to upper and lower level discriminators ULD2 and LLD2, ULD3, and LLD3,....respectively. The upper level discriminators ULD1, ULD2, ULD3,....are adapted to detect that the output levels of the preceding differential amplifiers DA1, DA2, DA3,....are positive and produce rectangular signals each having a pulse width equal to the period of time for which each output level is positive. On the other hand, the lower level discriminators LLD1, LLD3,LLD3, ....are adapted to detect that the output levels of the differential amplifiers DA1, DA3,DA3, ....are negative and produce rectangular signals each having a pulse width equal to the period of time for which each output level is negative. That is, each of the upper level discriminators is adapted to provide an output when $e>e_{i}+1$ $(i=1, 2, 3, ....)$ and each of the lower level discriminators is adapted to provide an output when $e_i<e_{i}+1$ $(i=1, 2, 3, ....)$ The output of the upper level discriminators ULD1 is taken out as a formant output as it is. The outputs of the lower level discriminators LLD1 and upper level discriminators ULD2 are imparted to a NAND circuit NG1, and the outputs of the lower level discriminator LLD2 and upper level discriminator ULD3 to a NAND circuit NG2. That is, the output terminal of an upper level discriminator adapted to detect that the output of a differential amplifier is at a positive level and the output terminal of a lower level discriminator adapted to detect that the output of a differential amplifier is at a negative level are connected with a common NAND circuit.

If it is assumed that an energy peak is present in the pass band of the band pass filter BPF2 for example, then the following relationships will hold between the outputs $e_1$, $e_2$ and $e_3$ of the buffer amplifiers B1, B2 and B3:

$e_1<e_2$ $e_2>e_3$ Thus, the differential amplifier DA1 provides a negative output, and the differential amplifier DA2 provides a positive output. Therefore, the output of differential amplifiers DA1 and DA2 are detected by the lower level discriminator LLD1 and upper level discriminator ULD2 respectively, so that the output of the NAND circuit NG1 is changed to show that an energy peak is present in the band of the band-pass filter BPF2. This signal indicative of the presence of a formant is brought into coincidence with a time signal which is obtained as the output of the matrix driving circuit having the below-mentioned arrangement and then written and stored in a predetermined one of the elements constituting the matrix 13.

Figure 9:
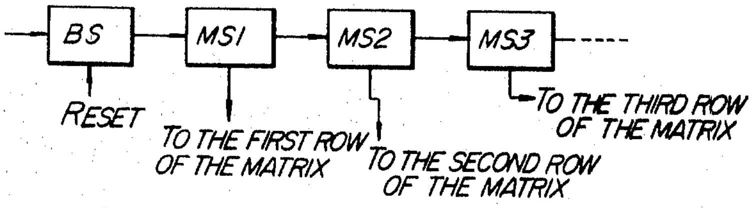
Figure 10:
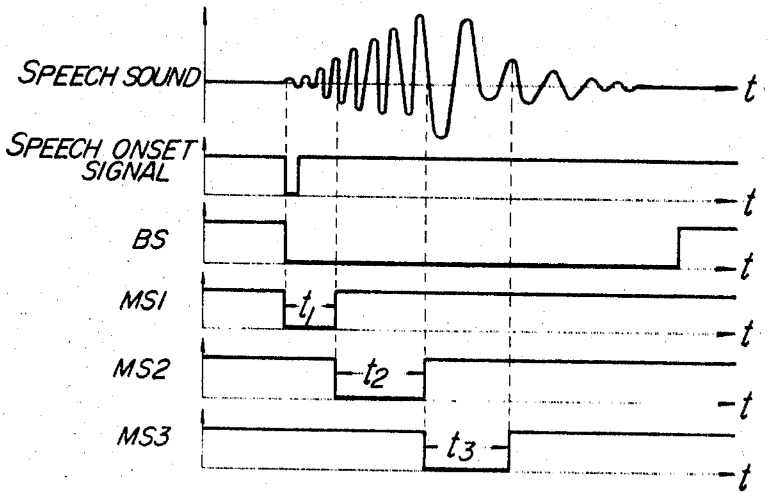

FIG. 9 shown the matrix driving circuit 14 wherein a single bistable MS2 BS is connected in series with monostable circuits MS1, MS2, MS3,....corresponding to the rows of the matrix 13 respectively. The bistable circuit BS is triggered by the output of the detector of the sound onset 4 to drive the succeeding monostable circuit MS1. This monostable circuit provides an output for a predetermined period of time which depends upon the circuit constants thereof. The monostable circuit MS2 is triggered by the trailing edge of an output pulse available from the preceding monostable circuit MS1. In this way, the monostable circuits MS2, MS3,....repeat the same operation as that of the monostable circuit MS1, and the writing is effected with respect to the corresponding rows of the matrix 13 during the operation of the monostable circuits MS1, MS2, MS3,....FIG. 10 shows the resulting waveforms, from which it will be seen that the operating times $t1$, $t2$, $t3$,....of the monostable circuits MS1, MS2, MS3,....are selected to be suited to the analysis and recognition of a word. It is easy to realize such an arrangement that the reset pulse is applied to reset the bistable circuit BS after a voice signal has become extinct.

With the foregoing arrangement, a formant which arrives during the operation of the monostable circuit MS1 for example is written in a matrix element which is incorporated in the first row of the matrix 13 and which corresponds to the frequency band in which the formant is present. A similar operation is performed with respect to the second and succeeding rows of the matrix 13. Thus, there is formed in the matrix 13 a pattern in which the information represented by the voice signal is arranged in respect of time.

By shifting the voice frequency of a speaker in accordance with the pitch frequency thereof as described above, it is possible to easily normalize a frequency to time pattern. Simply by shifting the voice frequency to a higher frequency region, the time constants of the various filters as well as those of the integrators can be reduced so that voice analysis can be effected at a high speed.

With the foregoing apparatus, however, problems tend to arise in an attempt to analyze a voiceless sound such as for example a consonant, although it works effectively for analyzing a voiced sound such as a vowel. Therefore, there is required an apparatus which is also capable of analyzing voiceless sounds at a high speed and with a high accuracy.

Figure 2B:
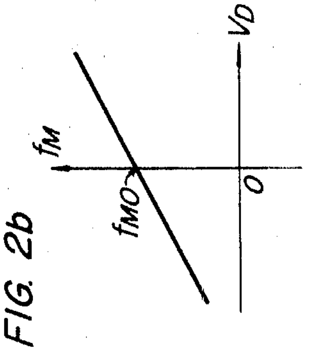
Figure 2A:
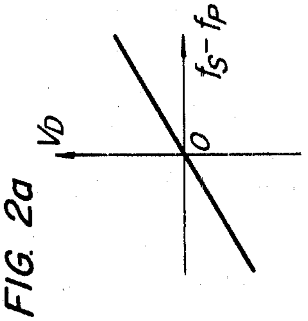
Figure 11:
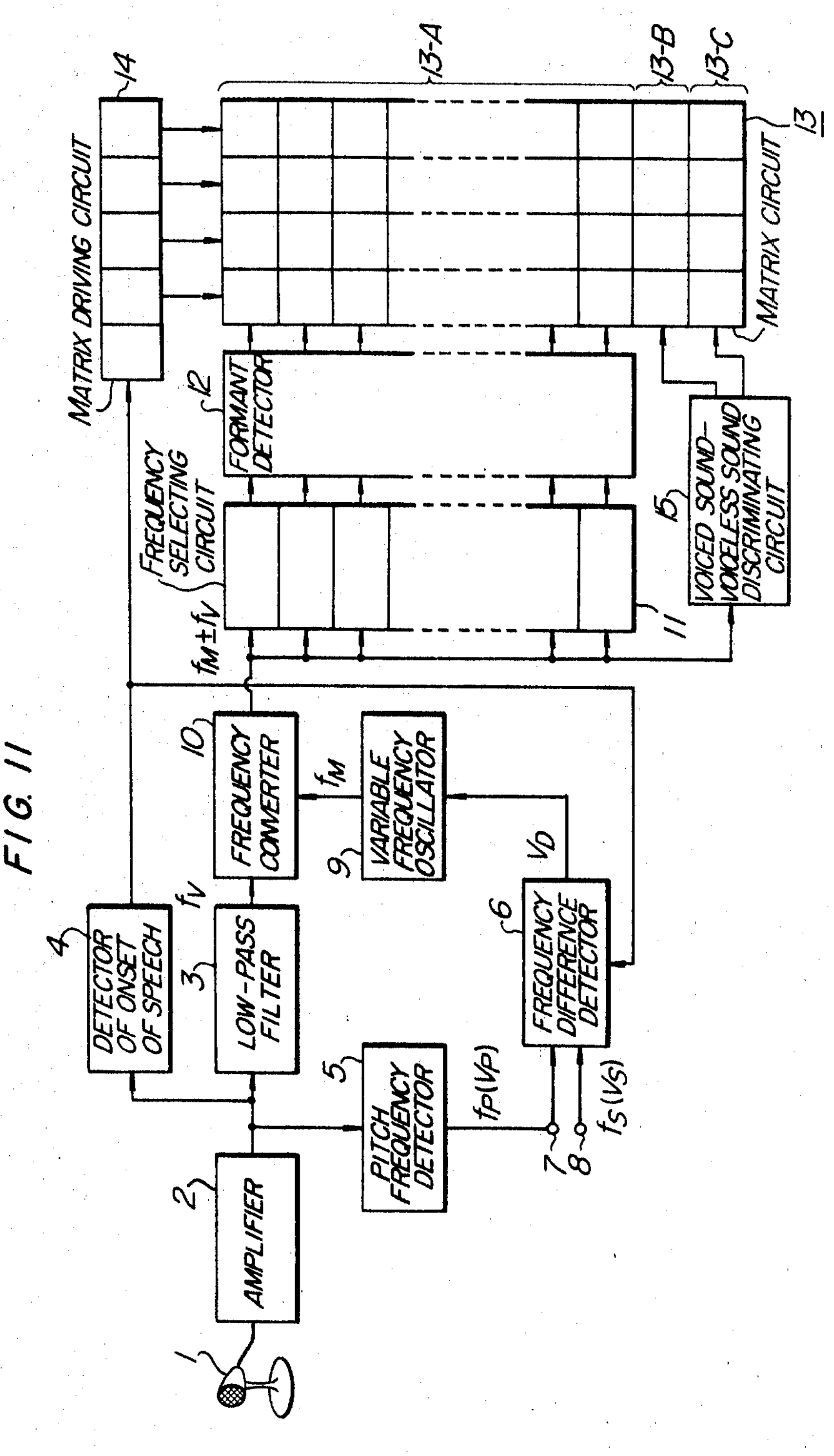
FIG. 11 is a diagrammatic view showing the voice analyzing apparatus according to a second embodiment of the present invention.

FIG. 11 shows the arrangement of an apparatus which is also designed so as to make possible the analysis of voiceless sound, the major portion of which is identical with the arrangement shown in FIG. 1. Therefore, elements for achieving the same functions as those in FIG. 1 are indicated by like reference symbols, and further description thereof will be omitted.

Referring to FIG. 11, numeral 15 represents a voiced sound-voiceless sound discriminating circuit to which the output signal of the frequency converter 10 is supplied. This voiced sound-voiceless sound discriminating circuit 15 is so designed as to make discrimination as to whether speech sound at each point of time is a voiced sound or a voiceless sound by comparing the lower frequency band energy in the output signal of the frequency converter 10 and the higher frequency band energy therein with each other.

The matrix circuit 13 for storing a frequency to time pattern includes matrix circuits 13–B and 13–C which share the timing column, in addition to the matrix portion 13–A which is adapted to store a formant occurring in the speech frequency region as described above in connection with FIG. 1. The output of the voiced sound-voiceless sound discriminating circuit 15 is supplied to the matrix circuits 13–B and 13–C so that the presence or absence of a voiced sound is written in the circuit 13–B and the presence or absence of a voiceless sound in a circuit 13–C, for example. That is, "1" is written in the respective elements of the matrix circuit 13–B in the presence of a signal indicative of the occurrence of a voiced sound, while "0" is written in them in the absence of such a signal. Similarly, "1" is written in the matrix circuit 13–C when a voiceless sound occurs, while "0" is written therein when no voiceless sound occurs. Thus, it is possible to determine the presence or absence of a voiced or voiceless sound from the contents stored in the matrix circuits 13–B and 13–C. The order of occurrence is also memorized.

Figure 12:
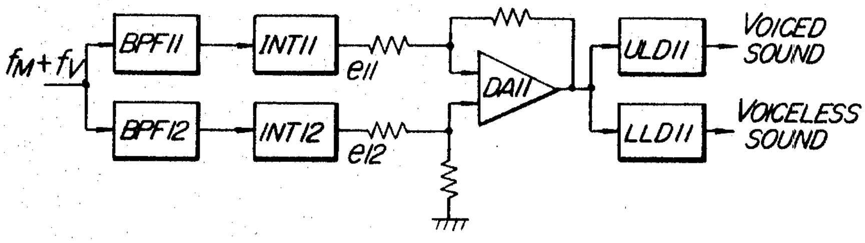
FIG. 12 is a view showing the arrangement of the most peculiar element.

FIG. 12 shows the arrangement of the voiced sound-voiceless sound discriminating circuit 15, wherein the normalized output signal available from the frequency converter 10 is first filtered out by means of a band pass filter BPF11 of which the pass band ranges from ($f_{MO}$+200) Hz. to ($f_{MO}$+1500) Hz. and band-pass filter BPF12 of which the pass band ranges from ($f_{MO}$+2000) Hz. to ($f_{MO}$+7000) Hz. The reason is as follows. Generally, a voiced sound has a majority of energy thereof concentrated in a lower frequency region of the speech frequency band, while a voiceless sound has energy thereof concentrated in a higher frequency region. The outputs of the band pass filters BPF11 and BPF12 are integrated by integrators INT11 and INT12 respectively, and the integration outputs $e_{11}$ and $e_{12}$ are supplied to a differential amplifier DA11 by which the difference ($e_{11}$ $-e_{12}$) between the inputs thereto is amplified and which provides a positive output when $e_{11} > e_{12}$ and a negative output when $e_{11} < e_{12}$ Thus, if an output is provided by the upper level discriminator ULD11, the differential amplifier DA11 provides a positive output which shows that the input voice is a voiced sound. On the other hand, if an output is provided by the lower level discriminator LLD11, this indicates the arrival of a voiceless sound. For example, if a word "san" which means "three" in Japanese arrives, then the lower level discriminator LLD11 is first made to provide an output by the fricative sound "S," and then the upper level discriminator ULD11 is made to provide an output by the vowel sound "*ae*." For "*N*," no output occurs since the inputs to the differential amplifier DA11 becomes equal to each other so that no indication is made as to whether the input voice is a voiced sound or a voiceless sound. Thus, "010" is written in those elements of the matrix circuit 13–B which store a voiced sound in the order of occurrence, and "100" is written in those elements of the matrix circuit 13–C which store a voiceless sound similarly in the order of occurrence. In the case of "ichi" which means "one" in Japanese, the vowel sound "*i*" is first memorized in the matrix circuit 13–B, subsequently the fricative sound "t$\int$" is memorized in the matrix circuit 13–C, and then the last vowel sound "*i*" is memorized in the matrix circuit 13–B. In this case, therefore, the pattern in the matrix circuit 13–B becomes "101," and that in the matrix circuit 13–C becomes "010."

From the foregoing, it will be seen that in the arrangement just described above, use is made of means to normalize the transition of the formant of a voice which occurs when a speaker is speaking irrespective of individual difference and store the timing arrangement in the matrix, in combination with means for discriminating between a voiced sound and a voiceless sound. With such arrangement, therefore, it is possible to form patterns representing time variations of voice characteristics which constitute important factors for speech recognition. It has been found that codes thus formed are effective for speech recognition because a consonant, especially a short consonant can positively be recognized as compared with the pattern used in the conventional method.

We claim:

1. A speech analyzing apparatus comprising means for detecting the difference in frequency between an input voice and a standard voice signal, means for generating a signal having a frequency corresponding to the output of said detecting means, means for shifting the frequency band of said input voice in accordance with the output of said signal generating means to normalize said frequency band on a frequency axis, frequency selecting means having a plurality of pass bands which are assigned to the voice signal of which the frequency band has been shifted, means for detecting a signal representing the amplitude of a signal component occurring in each of said plurality of bands and comparing the amplitude of the detected signal and that of a signal occurring in the adjacent band to detect local maximum values of the voice spectrum, and storage means for storing said local maximum values in the order of occurrence thereof.

2. A speech analyzing apparatus according to claim 1, further including means for dividing the signal obtained by shifting the frequency band of the input voice into a signal component in a lower frequency region contained in the voice spectrum and a signal component in a higher frequency region contained therein, wherein discrimination is made between a voiced sound and a voiceless sound by means for comparing the energy magnitudes of said two signal components so that the discrimination result is stored in said storage means in accordance with the lapse of time.

3. A speech analyzing apparatus according to claim 1, wherein the input voice is shifted to a higher frequency region in accordance with the output of the means for detecting the difference in frequency between the input sound and the standard voice signal.

4. A speech analyzing apparatus according to claim 1, wherein the means for generating a signal corresponding to the difference in frequency between the input sound and the standard voice signal is constituted by LC oscillator means including a variable capacitance element and inductance element, and an output resulting from the detection of the difference in frequence between the input voice and the standard voice signal is applied to said variable capacitance element to change the oscillation frequency by changing the capacitance of said variable capacitance element in accordance with said output.

5. A speech analyzing apparatus according to claim 1, wherein the means for detecting the difference in frequency between the input voice and the standard voice signal is constituted by a differential amplifier to compare the amplitude of an analog signal corresponding to the pitch frequency of the input voice and that of an analog signal corresponding to the standard voice signal.

6. A speech analyzing apparatus according to claim 1, wherein the means for normalizing the input voice on the frequency axis is constituted by a double balanced modulator.

7. A speech analyzing apparatus according to claim 1, wherein the means for normalizing the input voice on the frequency axis is constituted by a amplitude modulator.

8. A speech analyzing apparatus according to claim 1, wherein the means for obtaining the local maximum values of the voice spectrum is constituted at least by an integrator, differential amplifier, upper level discriminator, lower level discriminator and gate circuit, the magnitudes of the outputs of the integrator for one of adjacent frequency bands and said integrator are compared with each other in said differential amplifier, and the output of said lower level discriminator and that of the upper level discriminator for said frequency band are supplied to said gate circuit.

9. A speech analyzing apparatus according to claim 1, wherein said storage means is constituted by a matrix circuit, and the local maximum values of the voice spectrum are stored in the respective element in the order of occurrence in accordance with the columns for the output of the frequency selecting means appointed by a shift register.

10. A speech analyzing apparatus according to claim 2, wherein the means for comparing the magnitudes of the two signal components occurring in the lower and higher frequency regions respectively is constituted by differential amplifiers, said two signal components are integrated and then supplied to said differential amplifiers to cause the latter to provide outputs corresponding to the relationship in amplitude between said two signal components, and said outputs are supplied to the upper level discriminators and lower level discriminators.

UNITED STATES PATENT OFFICE
CERTIFICATE OF CORRECTION

Patent No. 3,592,969 Dated July 13, 1971

Inventor(s) Hirokazu YOSHINO et al

It is certified that error appears in the above-identified patent and that said Letters Patent are hereby corrected as shown below:

Instead of "Matsuskita Electric Industrial Co., ltd. the Assignee should read MATSUSHITA ELECTRIC INDUSTRIAL CO., LTD.

Signed and sealed this 11th day of January 1972.

(SEAL)
Attest:

EDWARD M.FLETCHER,JR.
Attesting Officer

ROBERT GOTTSCHALK
Acting Commissioner of Patents